June 11, 1968 TERUO HOUSHI 3,388,220
MONOPHONIC AND STEREO FM RECEIVER WITH AUTOMATIC MONOPHONIC AND STEREO SWITCHING
Filed March 30, 1966
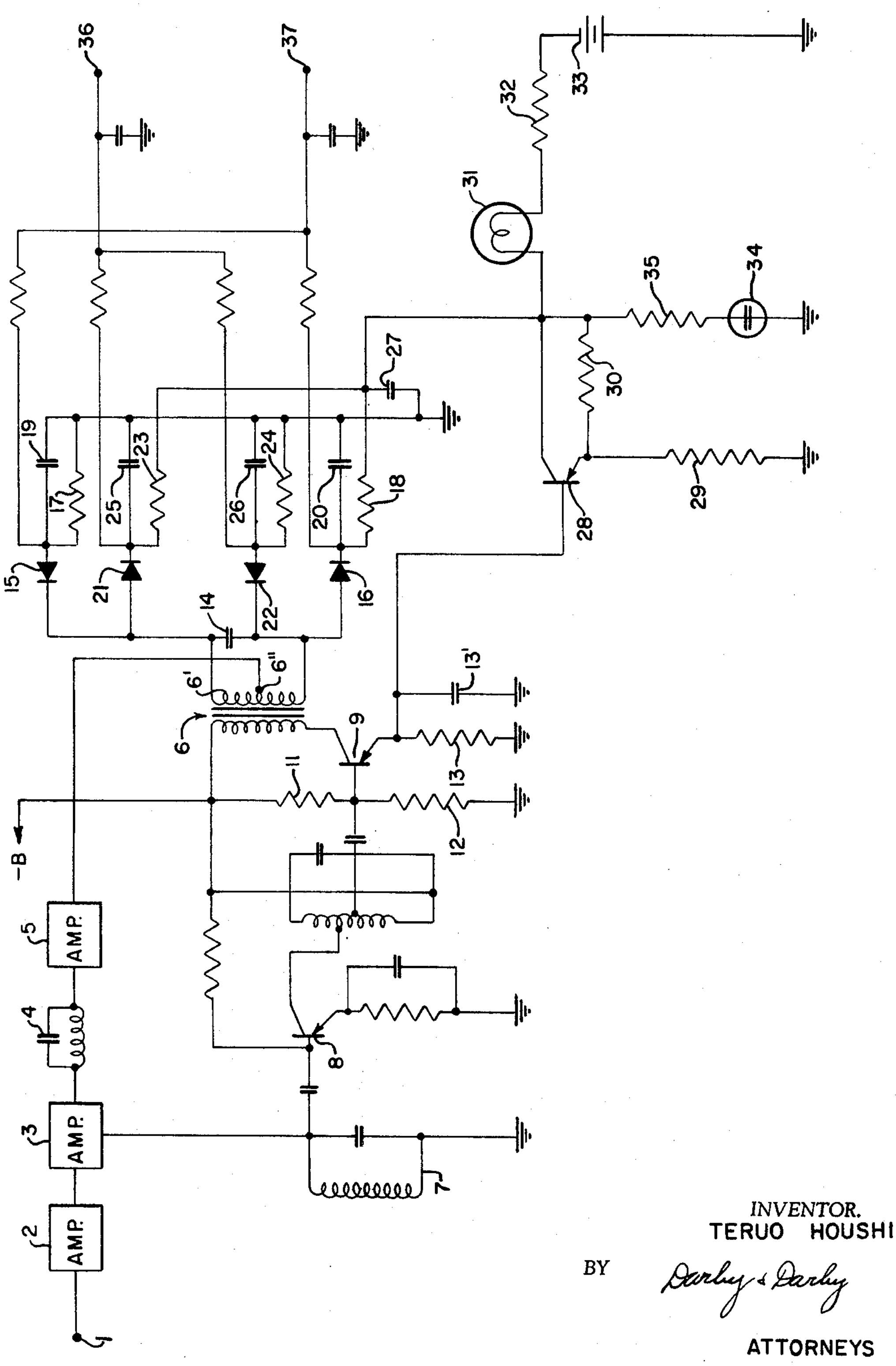
INVENTOR.
TERUO HOUSHI
BY Darby & Darby
ATTORNEYS United States Patent Office 3,388,220

Patented June 11, 1968

3,388,220

MONOPHONIC AND STEREO FM RECEIVER WITH AUTOMATIC MONOPHONIC AND STEREO SWITCHING

Teruo Houshi, Ora-gun, Gunma, Japan, assignor to Sanyo Electric Company, Ltd., Moriguchi, Osaka, Japan, a corporation of Japan Filed Mar. 30, 1966, Ser. No. 538,838
Claims priority, application Japan, Apr. 15, 1965, 40/29,962, 40/29,963
11 Claims. (Cl. 179—15)

ABSTRACT OF THE DISCLOSURE

A receiver for monophonic and stereo FM signals having automatic switching means which responds to the presence of a pilot signal on the composite FM stereo signal to enable the receiver demodulator circuit by producing a signal which returns diodes of the demodulator to a point of reference potential. The switching means operates in the absence of the pilot signal to bias the demodulator diodes to effect a change in the resonant frequency of a circuit supplying signals to the demodulator so that spurious signals at the normal operating frequency of the demodulator in response to a composite stereo signal do not adversely affect the demodulator.

This invention relates to improved stereo and monaural frequency modulation (FM) receiving apparatus and more particularly to a receiver with electrical switching means for automatically selecting the stereo-monaural receiving circuit in accordance with the type of FM broadcasting signal being received and producing an indication thereof.

It is well known in stereo FM broadcasting receivers, to have a stereo indicator triggered by the 19 kc. pilot signal and relay means for switching the stereo-monaural circuits which are also activated by the 19 kc. pilot signal. The present invention is directed to improvements in FM stereo-broadcasting receivers equipped with switching and indicating circuits operated by the 19 kc. pilot signal.

A principal object of the invention is to provide a new and improved stereo-FM receiver which is also capable of receiving and reproducing standard FM monaural signals. A further object is to provide a new and improved stereo FM receiver which does not require a manual stereo-monaural selector switch, but which reproduces automatically the audio stereo signals (L and R) or a monaural signal according to whether the station to which the receiver is tuned is broadcasting stereo FM or monaural FM signals.

An additional object of the invention is to provide a new and improved FM receiver which does not require mechanical means, such as a relay, to switch circuits for the reception of stereo or monaural signals but which reproduces stereo or monaural signal automatically and also indicates visibly whether stereo FM or FM monaural standard broadcasting signals are being received.

Other objects and advantages of the present invention will become more apparent upon consideration of the following specification and annexed drawing, in which FIG. 1 illustrates the circuit of the present invention.

In accordance with the invention, a switching transistor is used which is responsive to the presence of the 19 kc. pilot signal to energize an indicator which tells the the listener that a stereo FM signal is being received. The switching transistor reacts to the absence of the pilot signal to energize a second indicator, indicating that monaural signals are being received, and also for disabling the stereo signal detector.

In FIG. 1, input terminal 1 receives a signal which is produced by discrimination of the FM signal in a conventional detector (not shown). The other circuits preceding the detector also are not shown since they are conventional in the art. The signal at 1, which contains the audio information if a monaural signal is being received; or a composite stereo signal of $L+R$, 19 kc. pilot and 38 kc. suppressed sub-carrier on which the $L-R$ signals are modulated and the 67 kc. SCA signal, if one is used, is amplified in an amplifier stage 2. When a stereo composite signal is received the 19 kc. pilot signal is separated from the composite signal in a signal separating amplifier stage 3 which has a parallel resonant circuit 7 output tuned to 19 kc. The suppressed sub-carrier of 38 kc. is amplified in stage 3 and delivered to the neutral point 6″ of the secondary winding 6′ of a coupling transformer 6 through a 67 kc. parallel resonant trapping circuit 4 and an amplifier stage 5.

The separated 19 kc. pilot signal is delivered through tuned circuit 7 and a coupling capacitor connected to the upper terminal of the tuned circuit to the base of a transistor tuned amplifier 8 and is amplified to drive a frequency doubler transistor amplifier 9 operated as a class AB or class B amplifier. The collector of transistor 9 is connected to the lower end of the primary winding of coupling transformer 6 and its emitter is returned to ground by resistor 13 which is bypassed by a capacitor 13′. The emitter of transistor 9 supplies a 38 kc. signal to the base of a switching transistor 28.

The secondary 6′ of coupling transformer 6 is tuned by a capacitor 14 to be resonant at the frequency of the 38 kc. suppressed subcarrier signal conveying the difference information ($L-R$) of the stereophonic signal. Each terminal of the secondary winding 6′ is connected respectively and symmetrically with a push-pull channel of a synchronous detector. The first detector channel comprises oppositely poled diodes 15, 16 and their corresponding resistors 17, 18 and capacitors 19 and 20. The second channel comprises diodes 21, 22, resistors 23, 24 and capacitors 25 and 26. One end of each of the resistor-capacitor pairs 17, 19; 18, 20; 23, 25; 24, 26 is connected to its respective operating diode 15, 16, 21 and 22. The other end of each of resistors 17 and 24 and capacitors 19, 20, 25 and 26 is connected to ground. Resistors 18, 23 are grounded through a capacitor 27 whose upper terminal is connected to the collector of the switching transistor 28.

The emitter of the switching transistor 28 has a voltage dividing network of resistors 29, 30 connected thereto. A stereo indicator lamp 31 has one terminal connected to resistor 30 and the collector of switching transistor 28 and its other terminal connected to a negative potential source 33 through a protecting resistor 32. The switching transistor 28 is biased to be non-conductive when monaural FM broadcasting signals are received.

A stereo pilot signal received on the stereo FM broadcasting signal makes transistor 28 conduct.

A voltage sensitive monaural indicator light 34, such as a neon lamp, is connected between the collector of transistor 28 and ground in series with a protecting resistor 35.

In operation, the composite stereo signal discriminated by the conventional FM detector is amplified by stage 2 and is delivered to the separating stage 3. The signal separating stage 3 preferably has a high impedance input with a 19 kc. pilot resonant tank circuit 7 being in the emitter, in the case of an emitter follower transistor. This tuned circuit makes the impedance in the emitter of the separating stage 3 high at 19 kc. pilot signal and thereby attenuates the 19 kc. component of the composite signal in the separator collector circuit. The 67 kc. SCA subcarrier, if present in the composite signal, is eliminated by the tuned circuit 4. Amplifier 5 provides a low impedance voltage source to the time-sharing synchronous detector circuit associated with the output of coupling transformer 6.

The stereo signal with suppressed 38 kc. subcarrier is put into the neutral point 6'' of the secondary winding 6' of the coupling transformer. The 19 kc. pilot signal is amplified by 19 kc. tuned amplifier 8 and locks the frequency doubler amplifier 9 whose 38 kc. output is delivered to the primary winding of the coupling transformer 6. The stereo signal, less the 19 kc. pilot signal, is superimposed on the synchronous 38 kc. balanced output, secondary winding of the coupling transformer 6. The first channel, of the detector, diodes 15, 16, produces one stereo output signal L on terminal 36, and the second channel, diodes 21, 22, produces the other by conventional demodulator action due to the re-insertion of the 38 kc. subcarrier as a sampling signal in the two channels.

With a stereo signal being received, switching transistor 28 is made conductive by the voltage drop across the emitter resistor 13 of transistor double amplifier 9 and thus has a negligible impedance in series with resistor 29. This causes stereo indicator lamp 31 to light in the closed loop of voltage source 33, resistor 29, conducting switching transistor 28 and protecting resistor 32 to indicate the reception of stereo FM broadcasting.

The voltage on the upper terminal of capacitor 27 drops to a small value with transistor 28 conducting so that the diodes 15, 16 and 21, 22 are all essentially at the reference (ground) potential point and operate, as a time-sharing synchronous detector in accordance with the applied 38 kc. (sampling) subcarrier signal suffering no effect from the bias voltage source 33. In this manner the composite received stereo signal delivered to coupling transformer 6 is reproduced as R and L signal outputs at terminals 36 and 37.

When a monaural FM broadcasting signal, that is, only an audio signal having no pilot signal, is delivered to input terminal 1, it is amplified by stages 2 and 3 in the usual way, and put into the neutral point 6'' of the secondary winding 6' of transformer 6. The 19 kc. pilot signal tuned amplifier 8 and frequency doubler 9 are not made conductive in the absence of the pilot signal, and the potential of the emitter of transistor 9, a small negative voltage, appears on the base of the switching transistor 28 causing it to remain non-conductive. This places substantially the full negative potential of the bias source voltage on the upper terminal of capacitor 27. This negative voltage is delivered to the two series circuits comprising resistor 18 and diode 16 and resistor 23 and diodes 21 respectively, thereby forward biasing diodes 16 and 21. Diodes 22 and 15 are forward-biased when diodes 16 and 21 conduct, resulting in all four diodes being conductive. Thus, the monaural audio signal put into the neutral point of the secondary winding 6' is produced equally to both R and L output terminals 36 and 37 through each of the four diodes.

In addition, the following effect should be recognized. With lower effective impedances of the four diodes 15, 16, 21 and 22, in response to a monaural signal, the secondary of the coupling transformer 6 sees an equivalent capacitance comprising the capacitor 14 connected in parallel with series circuit of parallel connected capacitors 19, 25 and capacitors 20, 26. This equivalent capacity tunes the secondary 6' to a frequency higher than 38 kc. so that even if noises and high audio signal harmonics near 38 kc. are delivered to the primary winding of coupling transformer 6, no effective voltage like the 38 kc. (sampling signal) subcarrier signal is produced at the secondary winding 6', avoiding false operation of the time-sharing demodulator circuit.

At the same time, monaural indicator lamp 34 is activated by the high voltage at the collector of the non-conducting switching transistor 28 to indicate the reception of a monaural FM broadcasting signal.

The circuit illustrated in FIG. 1 in one practical embodiment of the invention found to operate satisfactorily, employed the following circuit parameter which are merely by way of illustration and in no sense to be constructed as limiting:

| | |
|---|---|
| Resistors, 13, 29 | 1.5KΩ. |
| Resistor, 32 | 240Ω. |
| Resistors, 17, 18, 23, 24 | 27Ω. |
| Capacitors, 19, 20, 25, 26 | .001 μf. |
| Capacitor, 27 | 10 μf. |
| Lamp, 31 | 6 v. 25 ma. |

While a preferred embodiment of the invention has been described, it is to be understood that the invention may be otherwise embodied and that the scope of protection is to be determined by the appended claims.

What is claimed is:

1. A circuit for an FM stereo-monaural broadcast signal receiver responsive to a composite stereo signal including two audio signals, a suppressed carrier modulated by the two audio signals and a pilot signal; or a monaural signal, said circuit comprising:
   - means for selecting said pilot signal from said composite stereo signal,
   - means responsive to the selected pilot signal for producing a sampling signal at the frequency of said suppressed subcarrier signal,
   - demodulator circuit means including two channels each having at least one diode for receiving said composite stereo signal without said pilot signal or said monaural signal and connected to said sampling signal producing means for receiving said sampling signal,
   - switching means having an input connected to said pilot signal selecting means for producing in response to the pilot signal an electrical signal, and capacitor means connected to an output of said switching means and to one diode of each channel and responsive to said electrical signal to return said one diode of each channel to a point of reference potential to actuate the demodulator to reproduce the two audio signals contained in said composite stereo signal.

2. A circuit as set forth in claim 1 further comprising means for applying said sampling signal to said switching means and wherein said capacitor has a low impedance at the frequency of said sampling signal.

3. A circuit as in claim 1 wherein each said demodulator channel is formed by a pair of oppositely poled diodes operating in push-pull, each channel receiving said sampling signal, and said composite stereo signal without said pilot signal.

4. A circuit as in claim 1 said switching means is responsive to the absence of said pilot signal when a monaural signal is being received to produce an electrical signal and apply it to said demodulator means to disable said demodulator from demodulating said composite stereo signal and to enable it to pass the monaural signal.

5. A circuit as in claim 4 wherein said switching means operates in response to the absence of a pilot signal to produce a voltage to forward bias the demodulator diodes so that said demodulator will pass the monaural signal.

6. A circuit as in claim 1 further comprising first indicator means connected to an output of said switching means and adapted for connection to a source of potential, said switching means operating in response to said pilot signal to complete the circuit between said first indicator means and said source of potential to energize said lamp to indicate the reception of a stereo signal.

7. A circuit as in claim 6 further comprising second indicator means for indicating the presence of a monaural signal connected to an output of said switching means, said second indicator means being actuated by said switching means in response to the absence of said pilot signal.

8. A circuit for an FM stereo-monaural broadcast signal receiver responsive to a composite stereo signal including two audio signals, a suppressed carrier modulated by the two audio signals and a pilot signal; or a monaural signal, said circuit comprising:

means for selecting said pilot signal from said composite stereo signal, means responsive to the selected pilot signal for producing a sampling signal at the frequency of said suppressed subcarrier signal, demodulator circuit means including two channels each having at least one diode for receiving said composite stereo signal without said pilot signal or said monaural signal and connected to said sampling signal producing means for receiving said sampling signal, switching means having an input connected to said pilot signal selecting means and an output connected to said demodulator means to produce a voltage to bias the demodulator diodes so that said demodulator will pass the monaural signal in response to the absence of a pilot signal, a resonant circuit means is connected to the input of said demodulator means for applying the composite stereo signal less the pilot signal thereto, means connected to at least one of said diodes for changing the resonant frequency of said resonant circuit means, said diode when biased in response to the absence of the pilot signal connecting said frequency changing means to said resonant circuit means.

9. A circuit as in claim 8 further comprising first indicator means connected to an output of said switching means and adapted for connection to a source of potential, said switching means operating in response to said pilot signal to complete the circuit between said first indicator means and said source of potential to energize said lamp to indicate the reception of a stereo signal.

10. A circuit as in claim 9 further comprising second indicator means for indicating the presence of a monaural signal connected to an output of said switching means, said second indicator means being actuated by said switching means in response to the absence of said pilot signal.

11. A unit as set forth in claim 8 wherein said frequency changing means comprises at least one capacitor which is connected to said resonant circuit by said biased diode.

References Cited

UNITED STATES PATENTS

| | | | |
|---|---|---|---|
| 3,294,912 | 12/1966 | Merritt | 179—15 |
| 3,286,035 | 11/1966 | Dias et al. | 179—15 |
| 3,242,264 | 3/1966 | DeVries | 179—15 |
| 3,187,103 | 6/1965 | Loughlin et al. | 179—15 |

ROBERT L. GRIFFIN, *Primary Examiner.*